United States Patent Office 2,850,231
Patented Sept. 2, 1958

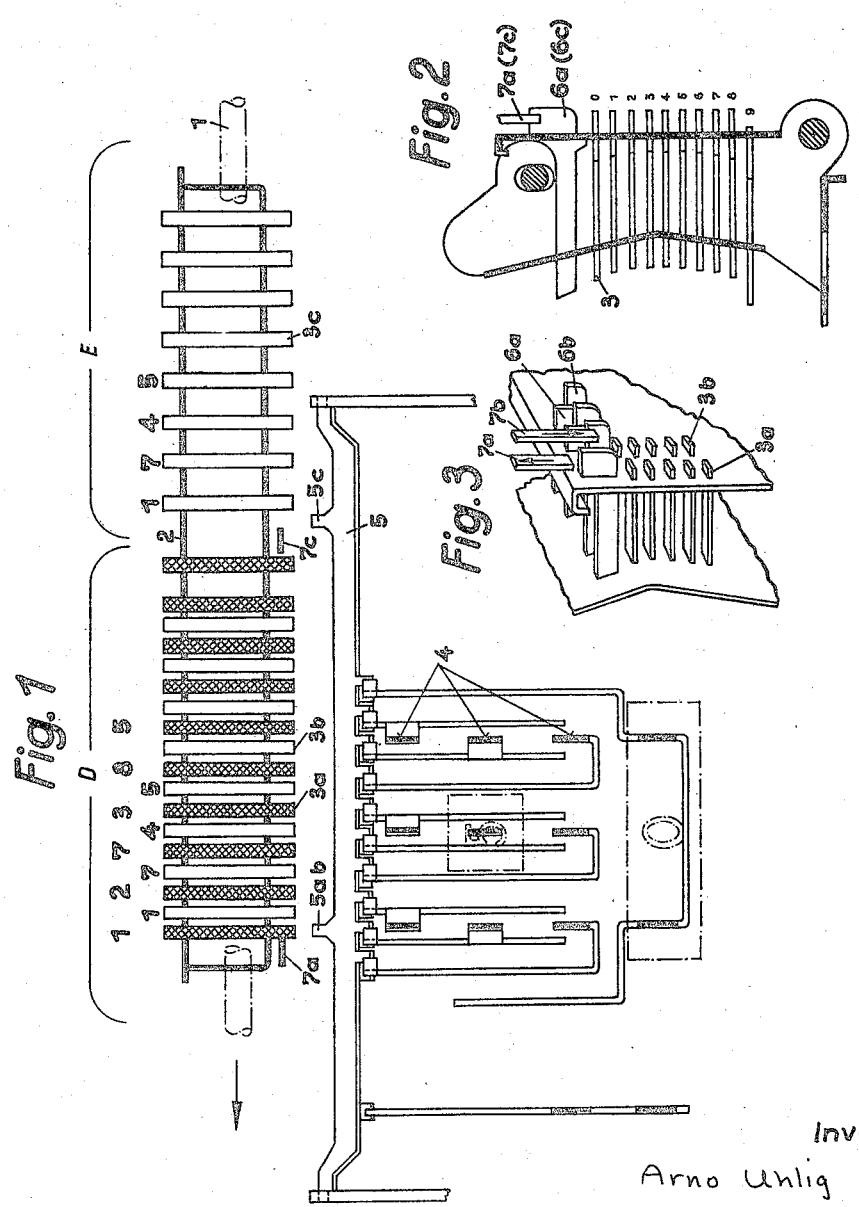

2,850,231

MULTIPLE INTERSPERSED PIN CARRIAGE

Arno Uhlig and Werner Uhlig, Oberndorf, Neckar, Germany, assignors to Olympia Werke Ag., Wilhelmshaven, Germany Application April 11, 1955, Serial No. 500,542

6 Claims. (Cl. 235—60)

The present invention relates to calculating machines and more particularly to a pin carriage arrangement for calculating machines.

In calculating machines which include a 10-key keyboard together with additional function keys for carrying out addition, subtraction, multiplication and division, it is customary to provide several pin carriages beside each other for movement along the same path in order to receive numbers set into the machine and to transfer these numbers to the calculating organs of the machine. Because a plurality of pin carriages are required in such conventional machines to be located beside each other and to move along the same path the width of the machine which is required to accommodate the several pin carriages is far greater than the width required by other elements of the machine, and therefore the conventional machines are necessarily of a larger size than they would be if the pin carriage arrangement could be altered so as not to require so much space.

One of the objects of the present invention is to prevent the above drawbacks by providing a pin carriage arrangement capable of accomplishing the same results as conventional pin carriage arrangements, but requiring a width which is but a fraction of that required by conventional pin carriage arrangements.

An additional object of the present invention is to provide a calculating machine with a multiple pin carriage which combines in itself a plurality of conventional pin carriages and which requires a space which is no greater than or at the most slightly greater than that required by a single conventional pin carriage.

Another object of the present invention is to provide in association with a multiple pin carriage of the above type means for indicating a value set into one of the carriages forming part of the multiple pin carriage.

A further object of the present invention is to provide structure for simultaneously actuating a pair of pin carriages.

Still another object of the present invention is to provide stop means for controlling the stepwise movement of the pin carriage arrangement of the invention in such a way that a single stop means may be used to properly locate the pins of a pair of pin carriages.

With the above objects in view, the present invention mainly consists of a calculating machine which includes a carrier means for carrying a plurality of pins of a pin carriage to form a pin carriage with these pins. A support means supports the carrier means for stepwise movement in a given direction through a predetermined distance after each digit is inserted into the machine. A plurality of rows of pins are carried by the carrier means and are spaced from each other by a fraction of the predetermined distance through which the carrier means moves in each of its stepwise movements, so that the carrier means and the rows of pins form a multiple pin carriage which combines in a single structure the equivalent of a number of pin carriages equal to the reciprocal of said fraction.

The novel features which are considered as characteristic for the invention are set forth in particular in the appended claims. The invention itself, however, both as to its construction and its method of operation, together with additional objects and advantage thereof, will be best understood from the following description of specific embodiment when read in connection with the accompanying drawings, in which:

Fig. 1 is a partly diagrammatic fragmentary top plan view of a pin carriage arrangement of the invention together with structure of the invention for actuating the pins of the pin carriage arrangement;

Fig. 2 is a partly sectional side elevational view of part of the pin carriage arrangement of Fig. 1 showing a stop means associated with this pin carriage arrangement; and Fig. 3 is a fragmentary perspective view diagrammatically illustrating the manner in which a pair of stop means cooperate with the pin carriage arrangement of the invention.

Referring now to the drawing, it will be seen from Fig. 1 that the calculating machine includes a stationary horizontal shaft 1 shown in dot-dash lines in Fig. 1 extending completely through the machine from one side wall in order to support a carrier means 2 for stepwise movement to the left, as viewed in Fig. 1, in the direction of the arrow shown therein. This carrier means 2 forms a box-like structure having end walls through which the shaft 1 passes freely and having front and rear walls formed with a plurality of rows of aligned openings to accommodate pins of the pin carriage arrangement for forward and rearward movement. These pins 3 of the pin carriage arrangement extend horizontally through the pairs of openings in the manner indicated in Fig. 1 for free sliding movement with respect to the carrier means 2. In the particular carrier means 2 illustrated in Fig. 1 the equivalent of three separate pin carriages are located as described below.

The mechanism of the calculating machine is designed in a known way to move the carrier 2 stepwise to the left through a distance at each step corresponding to the distance between adjacent rows of pins of a single pin carriage. In order to receive the numbers of two different values, such as, for example, a multiplicand and a multiplier, the carrier means 2 carries the vertical rows of pins 3a and 3b of two separate pin carriages which are thus combined in the left portion of the carrier means 2, as viewed in Fig. 1, into a multiple pin carriage D which is in this case a double pin carriage. The pins 3a are shaded to clearly distinguish the same from the pins 3b, and the successive rows of pins 3a and 3b are spaced from each other by a distance equal to one-half of the distance through which carrier 2 moves at each step. In other words, the distance from the center of a pin 3a to the center of an adjacent pin 3b is equal to one-half of the distance through which the carrier 2 moves at each step. Thus, each row of pins 3a forms with the next adjacent row of pins 3b a double row of pins and the space between corresponding points of two adjacent double rows of pins corresponds to the distance that the carrier 2 moves at each step. It should be noted that it is not necessary to have a number of rows of pins 3a which is equal to the number of rows of pins 3b, in which special case the double pin carriage D would be made up only of double rows. Instead, it is possible in accordance with the present invention to provide a capacity of one carriage included in the multiple pin carriage which is different from the capacity of the other carriage included therein so that, for example, the 9th and 10th places from the left as viewed in Fig. 1 are composed only of pins 3a, as shown in Fig. 1.

Actuation of the pins 3 takes place in a known way from a 10-key keyboard, the keys of which have bottom actuating feet 4 which actuate, as disclosed in U. S. Patent No. 2,742,228, Figs. 3 and 5, a mechanism for transferring the movement of the keys to corresponding swing members 5 located one above the other and equal in number to the number of pins in each vertical row. One of the swing members 5 is shown in Fig. 1 from which it may be seen that the swing members are turnably carried at their ends, and it is to be understood that a plurality of such swing members are located one above the other in such a way that when a given key is depressed it will turn the swing member whose elevation corresponds to the given key so that projections on the swing member will actuate a pin in a given row whose elevation corresponds to the number indicated on the particular key which is depressed. Thus, Fig. 2 shows a row of pins 3 which respectively correspond, from the top to the bottom, to the digits 0–9, respectively. Each of the swing members 5 includes a projection 5ab which cooperates with pins 3a or pins 3b depending on the relative position between the carrier 2 and the swing members.

In order to store values in the pin carriage arrangement or in order to be able to transfer values inserted into the pin carriage arrangement to an indicating mechanism which is not located directly over the multiple pin carriage D, the carrier means 2 extends to the right beyond the multiple pin carriage D to form a separate conventional pin carriage E connected directly to the multiple pin carriage D for movement therewith along the support means 1 and to carry in a purely conventional manner the rows of pins 3c which are spaced from each other in a conventional way by a distance equal to the movement of the carrier means 2 at each step. Thus, it is possible to arrange over this additional pin carriage E an indicator for indicating a value set into one of the pin carriages included in the multiple pin carriage D if the pins 3c are actuated in the same way as the pins 3a or the pins 3b. If it is desired to move pin carriage E independently of multiple pin carriage D instead of together with the same, then of course the carrier means 2 would not be made in one piece to accommodate pin carriages D and E.

The pins 3c are actuated by the same swing members 5 which actuate the pins 3a and 3b and more particularly by the projections 5c of these swing members. The distance between projections 5ab and 5c of each swing member 5 can be equal either to the distance between the row of pins 3a of the first double row of pins of the double pin carriage D and the first row of pins 3c of carriage E or to the distance between the row of pins 3b of the first double row of pins of multiple carriage D and the first row of pins 3c of carriage E. The latter arrangement is shown in Fig. 1. That is, Fig. 1 shows an arrangement where the distance between the projections 5ab and 5c is equal to the distance between the first row of pins 3b at the left end of carriage D in Fig. 1 and the first row of pins 3c at the left end of carriage E. Whether the distance between projections 5ab and 5c corresponds to one or the other of the cases mentioned above depends on the particular requirements of a given machine.

In order to be able to, for example, set into the rows of pins 3a the multiplicand and into the rows of pins 3b the multiplier, the structure for controlling the stepwise movement of the carrier means 2 must be so arranged that one or the other of the rows of pins 3a or 3b to be actuated is located in front of the projections 5ab. For this purpose, the carrier means 2 carries over the rows of pins 3a and 3b widened stop pins 6a and lengthened stop pins 6b, respectively, which cooperate alternately with the adjustable stop members 7a and 7b which are carried by the frame of the machine, stop member 7a being shorter than stop member 7b. It will be noted that the stop pins 6a are widened so as to extend to a higher elevation than the lengthened stop pins 6b so that the shorter stop member 7a may cooperate with stop pins 6a without any interference from the stop pins 6b. In order to actuate the pins 3a the stop member 7a is lowered in a known way to its operative position in which it cooperates with the stop pins 6a while at this time the stop member 7b lies out of the path of movement of the stop pins 6b. On the other hand, when it is desired to transfer numbers into the rows of pins 3b, the stop member 7a is raised to an inoperative position and the stop member 7b is lowered to an operative position where it will cooperate with the stop pins 6b. This operation is clearly indicated in a diagrammatic manner in Fig. 3.

For the arrangement shown in Fig. 1 where a double pin carriage D is shown together with a single pin carriage E, with all of these carriages carried by a common carrying means 2, it is possible to simplify the operation of the stop means 6a, 6b, 7a, 7b, since it is unnecessary to provide lengthened stop pins 6b over the rows of pins 3b because stop pins 6c located over the rows of pins 3c and having the same construction as the stop pins 6a will cooperate with another stop member 7c identical with stop member 7a to accurately locate the carrier means 2 in positions which place the rows of pins 3b in front of the projections 5ab. Thus, with this arrangement it is possible to completely eliminate stop pins 6b and to use only stop pins 6a and 6c which have the same construction. The above-described arrangement is discussed at greater length below where the operation of the structure of the invention is described.

In the starting position of the machine all parts are located in the position indicated in Fig. 1. The stop member 7a is located in its operating position to cooperate with the stop pins 6a respectively located over the rows of pins 3a, as indicated in Fig. 2. The stop member 7c is raised to its inoperative position and therefore does not extend into the path of movement of the stop pins 6c respectively located over the rows of pins 3c of the pin carriage E. The first operation is, for example, to set a multiplicand into the pins 3a. If this multiplicand is, for example, 127.385, then after the digit 1 is set into the first row of pins 3a of the first double row of pins at the left of the double pin carriage D, the carrier means 2 performs its first step to the left in such a way that the stop pin 6a over the row of pins 3a of the second double row of carriage D moves into engagement with the stop member 7a and then the second digit 2 of the multiplicand is set into this second row of pins 3a. These operations are repeated in the same way at all further positions of the multiplicand until the digit 5 is set into the row of pins 3a of the 6th double row of pins of the double carriage D. Then, this value which is set into the separate carriage formed by pins 3a may be transferred to the calculating mechanism or first the second value may be set into the double pin carriage.

In order to place into the pin carriage a multiplier of, for example, 17.45, the multiplication function key of the keyboard is depressed. In this way, in a purely conventional manner known to those skilled in the art, the carrier means 2 is returned to the right, as viewed in Fig. 1, to its starting position. The value inserted into the rows of pins 3a may be zeroed at this time if this value has already been transferred to the calculating mechanism. If this value has not been transferred then the pins 3a are not zeroed. In any event, the multiplicand may be retained in the pin carriage formed by pins 3a, if desired. All of the zeroing mechanisms may be made in accordance with the particular requirements of the machine and have no pertinence to the present invention.

An additional function performed by depression of the multiplication key is that of locating the stop member 7c in its operative position in the path of movement of stop pins 6c while at the same time the stop member 7a is raised to its inoperative position. Thus, the carrier means 2 is located at the beginning of this operation in a position where the row of pins 3b of the first double row of pins of multiple pin carriage D is located in front of the projections 5ab, and in this position this row of pins 3b may receive the first digit of the multiplier. It will be noted that the multiplier is transferred into the pin carriage E at the same time that it is transferred into the rows of pins 3b because of the above-described distance between projections 5ab and 5c. Thus, the successive rows of pins 3c will become located in front of the projections 5c at the same time that the successive rows of pins 3b become located in front of the rows of projections 5ab. The multiplier is set into the pin carriage arrangement of the invention by actuating the keys corresponding to the digits 1745 in the above example, and the carrier means 2 steps to the left while the stop member 7c cooperates in a known way with the successive stop pins 6c. Thus, the double pin carriage D as well as the single pin carriage E will simultaneously have the multiplier set therein until the last digit 5 of this multiplier actuates a pin 3b of the 4th of the double rows of pins of the double pin carriage and the corresponding pin 3c in the 4th row of pins of the pin carriage E. Finally, these values can be transferred in a known way to the calculating and indicating organs of the machine and then the values inserted into the pin carriage may be zeroed so that the pin carriage arrangement of the invention is ready to have the next value set into the same.

The concept of the present invention includes several variations and possibilities not mentioned above. Thus, for example, the distance between adjacent rows of pins of the multiple pin carriage may be equal to a third, for example, rather than a half of the distance of one step in the movement of the carrier means 2, and in this case a third stop means would be provided for the third set of rows of pins. Thus, such a construction would correspond to a multiple pin carriage in which three pin carriages were included, or such a combination of three pin carriages may be obtained with the structure of Fig. 1 where the swing members and stop members are adapted to set into the pin carriage E a third value completely independent of values set into the double pin carriage, this third value being transferred in a known way to the calculating mechanism, for example.

Furthermore, it is possible to place another double pin carriage where the single pin carriage E is located so that with a corresponding arrangement of the spaces between the pins and of the stop pins and stop members it is possible from a 10-key keyboard to insert either pairs of identical values in both double pin carriages or four different values to carry out double multiplications or divisions in pairs.

All of the above arrangements and variations are included within the purview of the above-described improvement in the arrangement of pin carriages of a calculating machine.

It will be understood that each of the elements described above, or two or more together, may also find a useful application in other types of calculating machines differing from the types described above.

While the invention has been illustrated and described as embodied in a pin carriage arrangement for calculating machines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features which fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a calculating machine, in combination, a shiftable carriage for supporting a plurality of rows of pins; support means supporting said shiftable carriage for stepwise movement in a given direction through a predetermined distance at each step after each digit is inserted into the machine; a plurality of rows of pins carried by said shiftable carriage and at least some of said rows of pins being spaced from each other by a fraction of said predetermined distance so that said shiftable carriage and rows of pins form a multiple pin carriage which combines in a single structure a plurality of equivalent pin carriages equal in number to the reciprocal of said fraction, the number of rows of pins which correspond to one equivalent pin carriage included in said multiple pin carriage being independent of the number of rows of pins in any other one of said equivalent pin carriages included in said multiple pin carriage; and a plurality of selectively operable stop means equal in number to said number of equivalent pin carriages each of which includes a predetermined number of rows of pins spaced from each other by said predetermined distance, each of said plurality of stop means being operatively connected to said shiftable carriage for controlling the stepwise movement thereof and to locate the predetermined number of rows of pins, which constitute a given equivalent pin carriage corresponding to the particular stop means, successively in an operating position, so that when a selected one of said stop means is operated the rows of pins which do not form part of the given equivalent pin carriage corresponding to said one stop means are skipped and do not enter into the operation.

2. In a calculating machine, in combination, a shiftable carriage for supporting a plurality of rows of pins; support means supporting said shiftable carriage for stepwise movement in a given direction through a predetermined distance at each step after each digit is inserted into the machine; a plurality of rows of pins carried by said shiftable carriage and spaced from each other by a fraction of said predetermined distance so that said shiftable carriage and rows of pins form a multiple pin carriage which combines in a single structure a plurality of equivalent pin carriages equal in number to the reciprocal of said fraction; and a plurality of selectively operable stop means equal in number to said number of equivalent pin carriages each of which includes a predetermined number of rows of pins spaced from each other by said predetermined distance, each of said plurality of stop means being operatively connected to said shiftable carriage for controlling the stepwise movement thereof and to locate the predetermined number of rows of pins which constitute a given equivalent pin carriage corresponding to the particular stop means, successively in an operating position so that when a selected one of said stop means is operated the rows of pins which do not form part of the given equivalent pin carriage corresponding to said one stop means are skipped and do not enter into the operation.

3. In a calculating machine as recited in claim 2, and an additional pin carriage located beside and connected with said multiple pin carriage for movement with the same along said support means, said additional pin carriage having rows of pins mutually spaced from each other by said predetermined distance.

4. In a calculating machine, in combination, a shiftable carriage for supporting a plurality of rows of pins; support means supporting said shiftable carriage for stepwise movement in a given direction through a predetermined distance at each step after each digit is inserted into the machine; a plurality of rows of pins carried by said shiftable carriage and spaced from each other by a fraction of said predetermined distance so that said shiftable carriage and rows of pins form a multiple pin carriage which combines in a single structure a plurality of equivalent pin carriages equal in number to the reciprocal of said fraction; a plurality of selectively operable stop means equal in number to said number of equivalent pin carriages each of which includes a predetermined number of rows of pins spaced from each other by said predetermined distance, each of said plurality of stop means being operatively connected to said shiftable carriage for controlling the stepwise movement thereof and to locate the predetermined number of rows of pins, which constitute a given equivalent pin carriage corresponding to the particular stop means, successively in an operating position, so that when a selected one of said stop means is operated the rows of pins which do not form part of the given equivalent pin carriage corresponding to said one stop means are skipped and do not enter into the operation; an additional pin carriage located beside and connected with said multiple pin carriage for movement with the same along said support means, said additional pin carriage having rows of pins mutually spaced from each other by said predetermined distance and adapted to be actuated simultaneously and in the same way as pins of one of the sets of rows of pins of said multiple pin carriage corresponding to a separate equivalent pin carriage, so that the position of the pins of said additional pin carriage may be used to actuate an indicating mechanism which indicates the number set into said separate pin carriage which forms part of said multiple pin carriage; a plurality of swing members carried by said support means opposite the pins of said multiple and additional pin carriages and each provided with a pair of projections extending toward said pin carriages for actuating preselected pins thereof, one of said pair of projections being spaced from the other of said pair of projections, when said other projection is in front of the first row of pins of said additional pin carriage, by a distance equal to that between said latter first row of pins and the first row of pins of said separate equivalent pin carriage forming part of said multiple pin carriage, so that said pair of projections simultaneously actuate corresponding pins of said separate and additional pin carriages; and a plurality of manually operable key means respectively cooperating with said plurality of swing members for respectively actuating the latter when said plurality of key means are manually operated.

5. In a calculating machine, in combination, a shiftable carriage for supporting a plurality of rows of pins; support means supporting said shiftable carriage for stepwise movement in a given direction through a predetermined distance at each step after each digit is inserted into the machine; a plurality of rows of pins carried by said shiftable carriage and spaced from each other by a fraction of said predetermined distance so that said shiftable carriage and rows of pins form a multiple pin carriage which combines in a single structure a plurality of equivalent pin carriages equal in number to the reciprocal of said fraction; an additional pin carriage located beside and connected with said multiple pin carriage for movement with the same along said support means, said additional pin carriage having rows of pins mutually spaced from each other by said predetermined distance and adapted to be actuated simultaneously and in the same way as pins of one of the sets of rows of pins of said multiple pin carriage corresponding to a separate equivalent pin carriage, so that the position of the pins of said additional pin carriage may be used to actuate an indicating mechanism which indicates the number set into said separate equivalent pin carriage which forms part of said multiple pin carriage; actuating means for operating the pins of an equivalent pin carriage and for concurrently operating corresponding pins of said separate equivalent pin carriage and said additional pin carriage; manually operable key means for operating said actuating means; first stop means cooperating with said shiftable carriage for successively stopping the rows of pins of said separate equivalent pin carriage and said additional pin carriage in a position to be actuated when said key means is operated; and second stop means cooperating with said shiftable carriage for successively stopping the rows of pins of an equivalent pin carriage different from said separate equivalent carriage included in said multiple pin carriage in a position to be actuated when said key means is operated.

6. In a calculating machine, in combination, a shiftable carriage for supporting a plurality of rows of pins; support means supporting said shiftable carriage for stepwise movement in a given direction through a predetermined distance at each step after each digit is inserted into the machine; a plurality of rows of pins carried by said shiftable carriage and spaced from each other by a fraction of said predetermined distance so that said shiftable carriage and rows of pins form a multiple pin carriage which combines in a single structure a plurality of equivalent pin carriages equal in number to the reciprocal of said fraction; an additional pin carriage located beside and connected with said multiple pin carriage for movement with the same along said support means, said additional pin carriage having rows of pins mutually spaced from each other by said predetermined distance and adapted to be actuated simultaneously and in the same way as pins of one of the sets of rows of pins of said multiple pin carriage corresponding to a separate equivalent pin carriage, so that the position of the pins of said additional pin carriage may be used to actuate an indicating mechanism which indicates the number set into said separate equivalent pin carriage which forms part of said multiple pin carriage; a plurality of swing members carried by said support means opposite the pins of said multiple and additional pin carriages and each provided with a pair of projections extending toward said pin carriages for actuating pre-selected pins thereof, one of said pair of projections being spaced from the other of said pair of projections, when said other projection is in front of the first row of pins of said additional pin carriage, by a distance equal to that between said latter first row of pins and the first row of pins of said separate equivalent pin carriage forming part of said multiple pin carriage, so that said pair of projections simultaneously actuate corresponding pins of said separate equivalent and additional pin carriages; a plurality of manually operable key means respectively cooperating with said plurality of swing members for respectively actuating the latter when said plurality of key means are manually operated; first stop means cooperating with said multiple pin carriage for stopping the rows of pins of said separate equivalent pin carriage and said additional pin carriage in a position to be actuated when said plurality of key means are operated; and second stop means cooperating with said multiple pin carriage for stopping the rows of pins of an equivalent pin carriage different from said separate equivalent carriage included in said multiple pin carriage in a position to be actuated when said plurality of key means are operated.

References Cited in the file of this patent

UNITED STATES PATENTS

| | | |
|---|---|---|
| 2,114,604 | Mehan | Apr. 19, 1938 |
| 2,330,450 | Robertson et al. | Sept. 28, 1943 |
| 2,667,307 | Westinger et al. | Jan. 26, 1954 |

FOREIGN PATENTS

| | | |
|---|---|---|
| 107,712 | Sweden | June 22, 1943 |
| 746,466 | Germany | Aug. 10, 1944 |